United States Patent
Finlayson et al.

(10) Patent No.: US 11,224,163 B2
(45) Date of Patent: Jan. 18, 2022

(54) ROTARY CUTTER WITH MOVABLE BLADE GUARD

(71) Applicant: Great Plains Manufacturing, Inc., Salina, KS (US)

(72) Inventors: Keith W. Finlayson, Gypsum, KS (US); Dan Base, Solomon, KS (US); Jeff Welsh, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 868 days.

(21) Appl. No.: 16/017,512

(22) Filed: Jun. 25, 2018

(65) Prior Publication Data
US 2019/0387675 A1    Dec. 26, 2019

(51) Int. Cl.
*A01D 34/52* (2006.01)
*A01D 34/81* (2006.01)
*A01D 34/66* (2006.01)
*A01D 101/00* (2006.01)

(52) U.S. Cl.
CPC ............. *A01D 34/81* (2013.01); *A01D 34/66* (2013.01); *A01D 2101/00* (2013.01)

(58) Field of Classification Search
USPC .................................... 56/255, 320.1, 320.2
See application file for complete search history.

(56) References Cited

U.S. PATENT DOCUMENTS

| | | | |
|---|---|---|---|
| 2,511,124 A | 6/1950 | Phelps | |
| 2,578,880 A * | 12/1951 | Doyle | A01D 34/63 56/17.2 |
| 3,369,350 A | 2/1968 | Harlan et al. | |
| 3,483,905 A | 12/1969 | Lawrence | |
| 3,496,707 A | 2/1970 | Kobey | |
| 3,797,213 A * | 3/1974 | Sadow, Jr. | A01D 34/828 56/320.1 |

(Continued)

FOREIGN PATENT DOCUMENTS

| | | |
|---|---|---|
| EP | 0119339 | 9/1984 |
| RU | 2102867 C1 | 12/1995 |

OTHER PUBLICATIONS

Australian Examination Report dated Feb. 24, 2020 for related Australian Patent Application No. 2019201031, 9 pages.

(Continued)

*Primary Examiner* — Thomas B Will
*Assistant Examiner* — Mai T Nguyen
(74) *Attorney, Agent, or Firm* — Hovey Williams LLP; Kameron D. Kelly

(57) ABSTRACT

A rotary cutter for cutting grass, brush, shrubs, bushes, trees, and other vegetation, and a method of using the same. The cutter includes a bi-fold door proximate to an open front portion of the cutter's deck, which defines an open cutting area. The bi-fold door moves between a closed position where it shields the cutting area and an open position where it exposes the cutting area. The bi-fold door includes a front cover rotatably coupled to a rear cover via the first hinge, with the rear cover being rotatably coupled to the deck via the second hinge. The cutter also includes a first ramp and second ramp flanking the open front portion of the deck. Protrusions of the bi-fold door slide along inclined surfaces of the ramps as the bi-fold door moves between the closed position and the open position.

21 Claims, 17 Drawing Sheets

(56) References Cited

U.S. PATENT DOCUMENTS

| | | |
|---|---|---|
| 4,107,907 A | 8/1978 | Rutherford |
| 4,282,704 A | 8/1981 | Stevens |
| 4,445,312 A | 5/1984 | Cartner |
| 4,509,315 A | 4/1985 | Giguere |
| 4,738,091 A | 4/1988 | Kulak et al. |
| 5,195,311 A | 3/1993 | Holland |
| 5,392,593 A | 2/1995 | Emery |
| 5,600,943 A | 2/1997 | Ryan |
| 5,657,620 A | 8/1997 | Thagard et al. |
| 5,713,191 A * | 2/1998 | Welton ................ A01D 34/416 56/12.1 |
| 5,765,348 A | 6/1998 | Thagard et al. |
| 5,826,417 A | 10/1998 | Evans |
| 6,138,444 A | 10/2000 | Torras, Sr. |
| 6,832,466 B2 | 12/2004 | Freiberg et al. |
| 7,185,479 B1 | 3/2007 | Cartner |
| 7,313,902 B1 | 1/2008 | Eavenson, Sr. et al. |
| 7,340,877 B2 | 3/2008 | Anderson |
| 8,857,144 B2 | 10/2014 | Koester |
| 9,648,803 B2 | 5/2017 | Harkcom et al. |
| 2013/0081370 A1 | 4/2013 | Koester |
| 2014/0041355 A1 | 2/2014 | Harkcom et al. |

OTHER PUBLICATIONS

Canadian Office Action dated Mar. 4, 2020 for related Canadian Patent Application No. 3,033,558, 4 pages.

\* cited by examiner

ROTARY CUTTER WITH MOVABLE BLADE GUARD

TECHNICAL FIELD

The present invention generally relates to cutters such as a rotary cutter used to cut grass, shrubs, bushes, trees, and other vegetation. More particularly, the present invention relates to a movable blade guard for a rotary cutter.

BACKGROUND OF THE INVENTION

Rotary cutters, such as brush cutters and lawnmowers, are used to cut and clear grass, brush, shrubs, bushes, and even trees from the land. These rotary cutters typically include a blade pan with one or more blades attached thereto. The blade pan is attached to a gearbox, hydraulic motor, or the like, which in turn is operatively connected to a user-driven machine such as a skidsteer or tractor. For example, a cutter's gearbox may be operatively connected to a power take-off (PTO) of a tractor, or a cutter's hydraulic motor may be operatively connected to a hydraulic supply and return line extending from a hydraulic pump of a skidsteer or other user-operated machine.

Cutters typically include a molded or welded deck substantially surrounding the blades to prevent inadvertent contact with the spinning blades, and further to shield clippings from being flung from the cutter causing damage or injury. But these decks limit what types and sizes of vegetation that the cutter may be used to cut. More particularly, because the deck substantially surrounds the spinning blades, the only vegetation that can encounter the blades is that which can fit underneath the margins of the deck. Thus, the cutter may be ill-suited for trimming shrubs, bushes, trees, and other types of tall vegetation that is too large to easily fit underneath an edge of the deck.

Some cutters include a movable guard to expose part of the blade path to cut large shrubs, bushes, trees, and the like. But these cutters require complex linkages and other actuating mechanisms to move the guard out of the way of the vegetation. Moreover, many movable guards require that an operator move the cutter deck in a certain fashion to actuate the movable guard. For example, an operator may be required to raise the cutter and then lower the device against the tall vegetation to push the guard vertically up and out of the way. This process is time consuming and disruptive to the normal travel of the cutter.

Thus, there remains a need for a rotary cutter that includes a deck that suitably shields the cutting path during use, but which allows the cutter to be used to trim bushes, shrubs, trees, and other tall vegetation that otherwise could not fit below the outer edges of the deck, and one that can do so during a typical cutting operation (i.e., forward movement of the cutter) without requiring an operator to lift the cutter or otherwise move the cutter to actuate the movable guard.

SUMMARY

Embodiments of the present invention are directed towards cutters, such as rotary cutters used to cut grass, brush, shrubs, bushes, trees, and other vegetation, that include a movable blade guard. In one embodiment, a cutter includes a deck having a first end and an opposing second end, with a bearing housing coupled to the deck between the first end and the second end. A blade assembly is rotatably coupled to the deck via the bearing housing, such that it can rotate with respect to the deck. The blade assembly includes a plurality of blades attached to a blade pan or the like. The cutter also includes a movable blade guard disposed at the first end of the deck and configured to move between a closed position and an open position. The blade guard includes a first cover, a second cover, a first hinge, a second hinge, one or more protrusions, and one or more ramps. The first cover is rotatably coupled to the second cover via the first hinge, the second cover is rotatably coupled to the deck via the second hinge, and the one or more protrusions are configured to move along an inclined surface of the one or more ramps as the blade guard moves between the closed position and the open position.

In another embodiment of the present invention, the deck includes an open front portion proximate to the first end that defines a cutting area. The cutter also includes a bi-fold door proximate to the open front portion of the deck, which moves between a closed position in which the bi-fold door shields the cutting area and an open position in which the bi-fold door exposes the cutting area. The bi-fold door includes a front cover rotatably coupled to a rear cover via the first hinge, with the rear cover being rotatably coupled to the deck via the second hinge. The cutter also includes a first ramp and second ramp flanking the open front portion of the deck. Two protrusions are configured to slide along an inclined surface of the first ramp and the second ramp as the bi-fold door moves between the closed position and the open position.

Other embodiments are directed to a method of cutting vegetation using such a rotary cutter. The method includes contacting a front impact member of the bi-fold door with a tree while continuing to move the rotary cutter toward the tree, thereby causing the bi-fold door to pivot so that the tree is received in the open front portion and cut by one or more blades of the rotary cutter.

Additional advantages and features of the present invention will be set forth in part in a description which follows, and in part will become apparent to those skilled in the art upon examination of the following or may be learned from practice of the invention.

BRIEF DESCRIPTION OF THE DRAWINGS

The present invention is described in detail below with reference to the attached drawing figures, in which like numerals represent the same components, and wherein.

DETAILED DESCRIPTION

Figure 1:
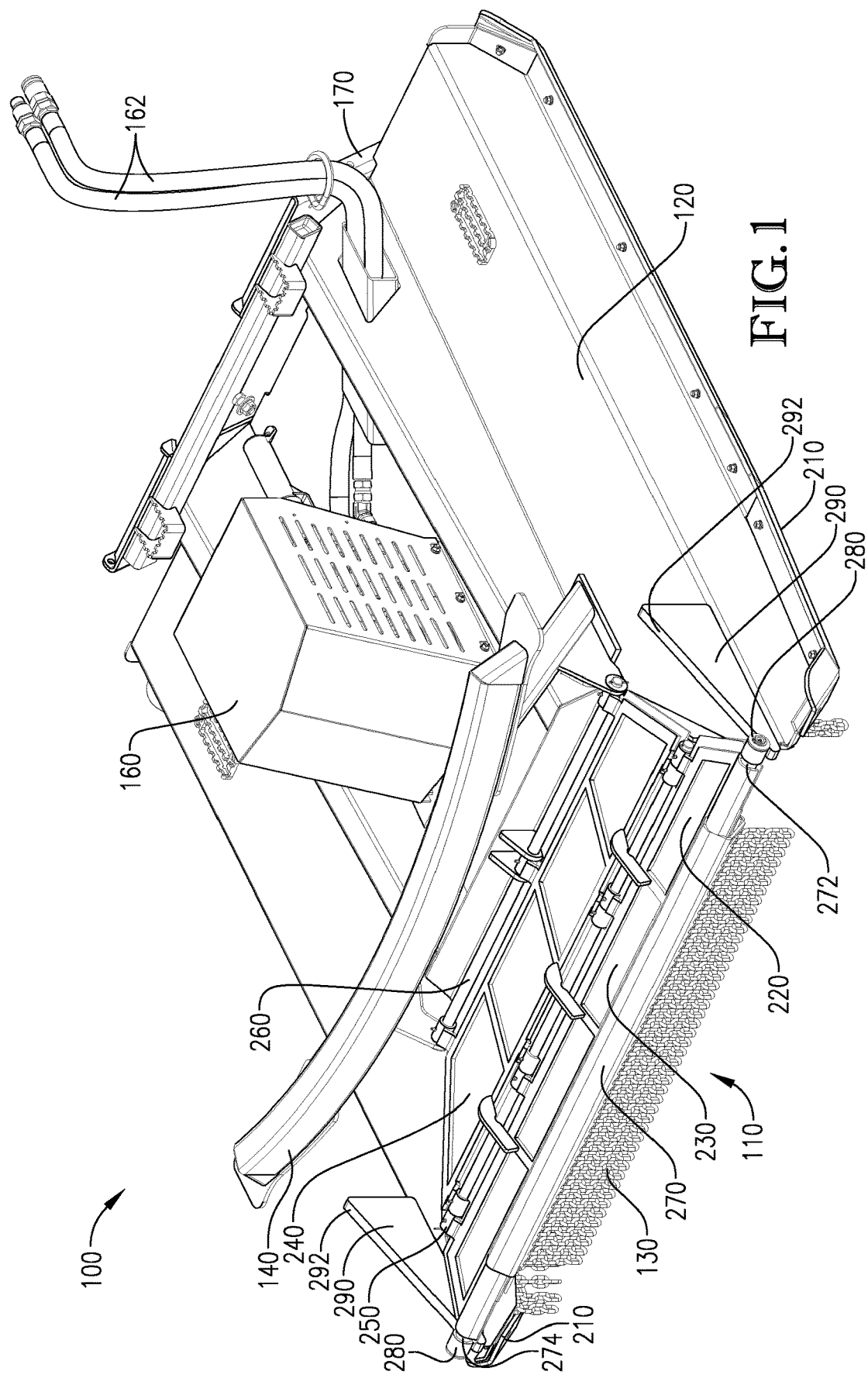
FIG. 1 is a left-front perspective view of a cutter assembly according to one embodiment of the present invention, shown from above the cutter assembly and with a bi-fold door in a closed position.
Figure 2:
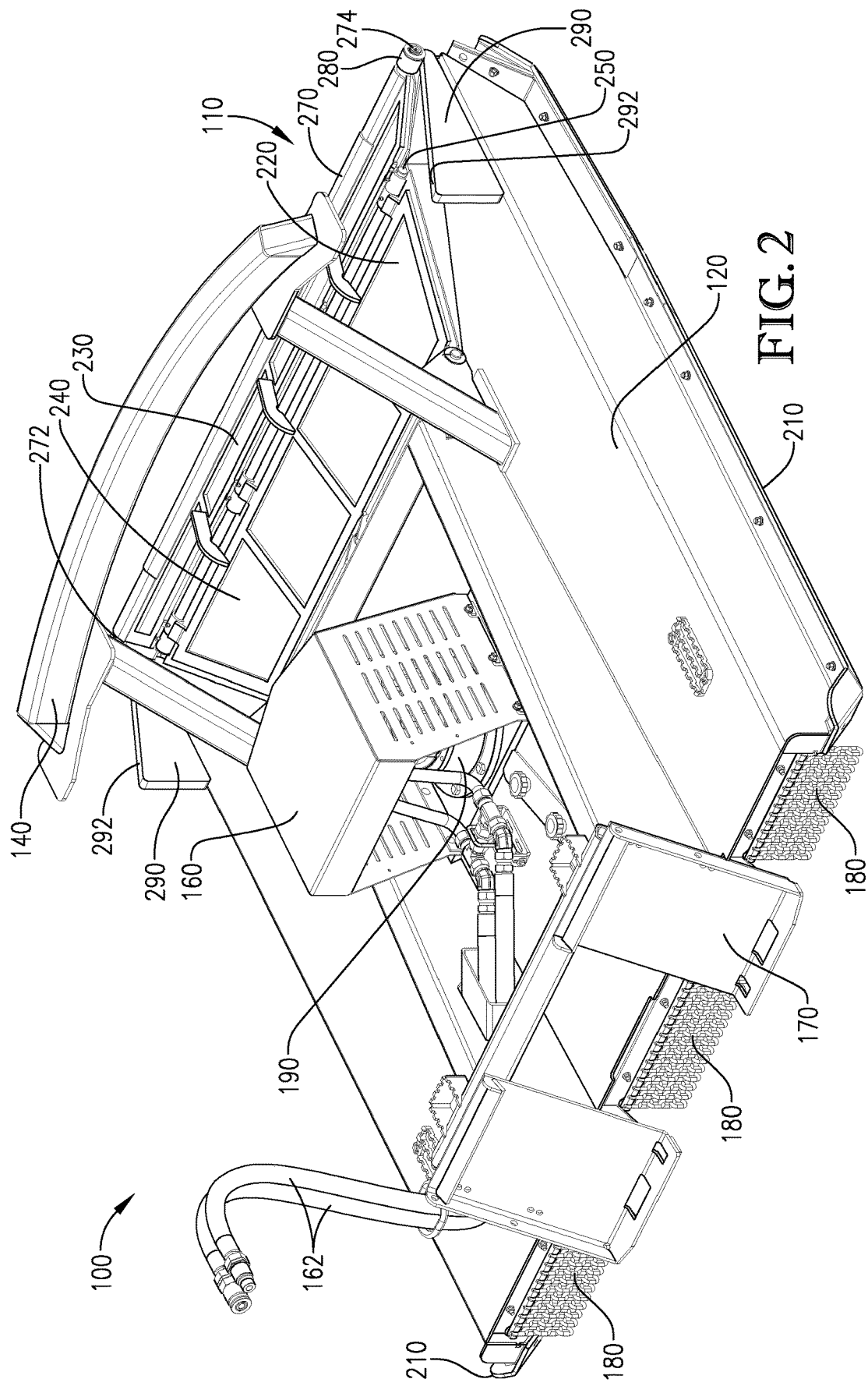
FIG. 2 is a right-rear perspective view of the cutter assembly shown in FIG. 1, shown from above the cutter assembly.

Embodiments of the instant invention will be described in detail with reference to the accompanying figures. FIG. 1 shows a cutter assembly 100 according to one aspect of the invention. The cutter assembly 100 is an attachment for a tractor, skid loader, skid-steer loader, skidsteer, or other machinery, and is configured to cut grass, shrubs, bushes, trees, and other vegetation. The cutter assembly 100 is removably attachable to the tractor, skidsteer, or other user-operated machinery using any conventional attachment means. In other embodiments, the cutter assembly 100 may form part of a standalone piece of machinery. For example, the cutter assembly 100 may be the cutting deck of, and thus integral to, a lawnmower or similar standalone piece of machinery.

The cutter assembly 100 generally includes a deck 120 including a movable blade guard 110 attached to an open front portion 122 of the deck 120. "Front" is used herein to refer to the forward-most side of the cutter assembly during movement of the cutter assembly 100 during normal operation. In this regard, in embodiments where the cutter is attached to a PTO of a tractor, the cutter may be attached behind the tractor, and thus the "forward" direction in that embodiment refers to the direction when the tractor is moving in reverse.

Figure 9:
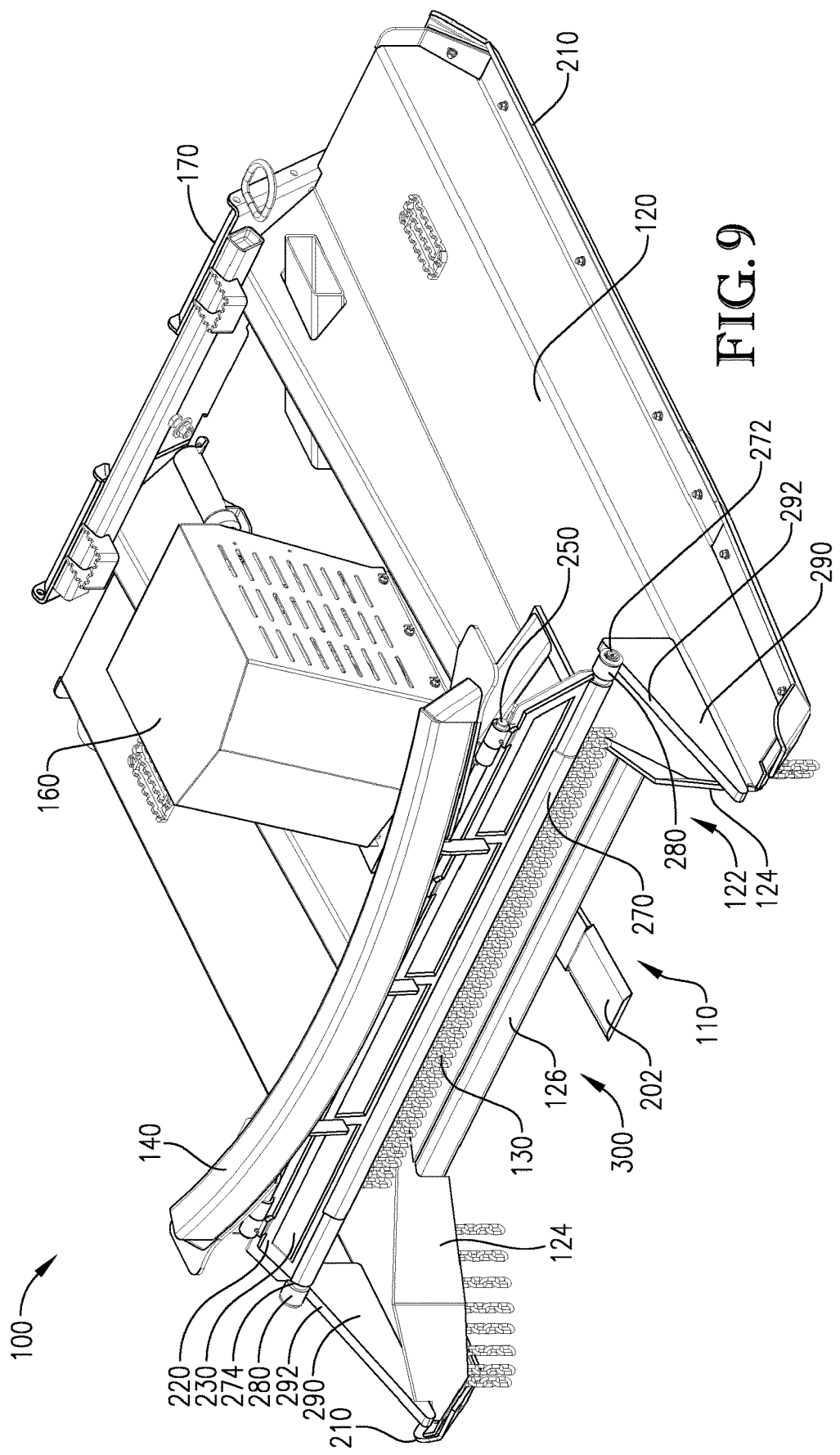
FIG. 9 is a left-front perspective view of a cutter assembly according to another embodiment of the present invention, shown from above the cutter assembly and with a bi-fold door thereof in an open or retracted position with the front of the door engaging ramps positioned on top of the deck.
Figure 14:
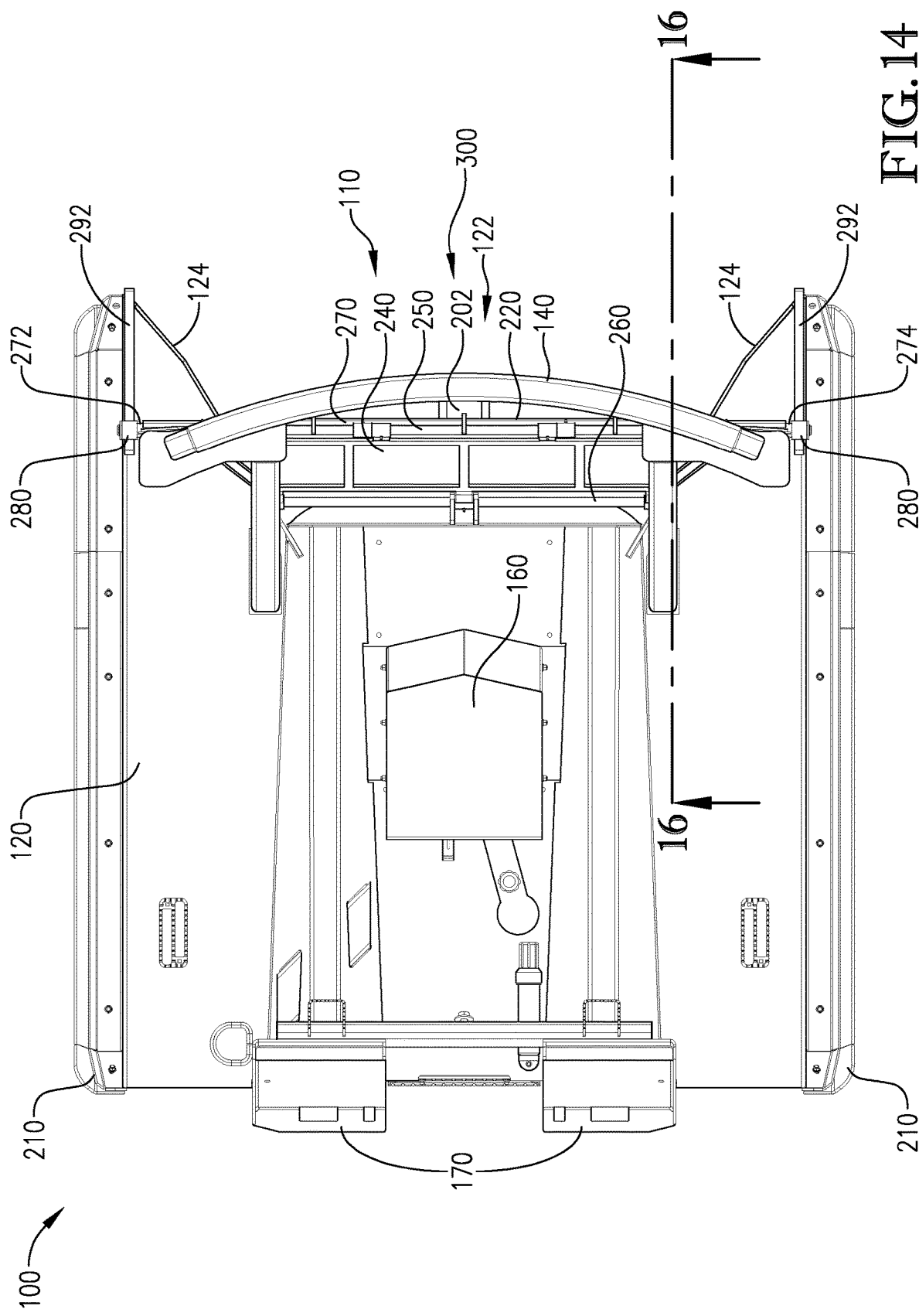
FIG. 14 is a top view of the cutter assembly shown in FIG. 9.
Figure 15:
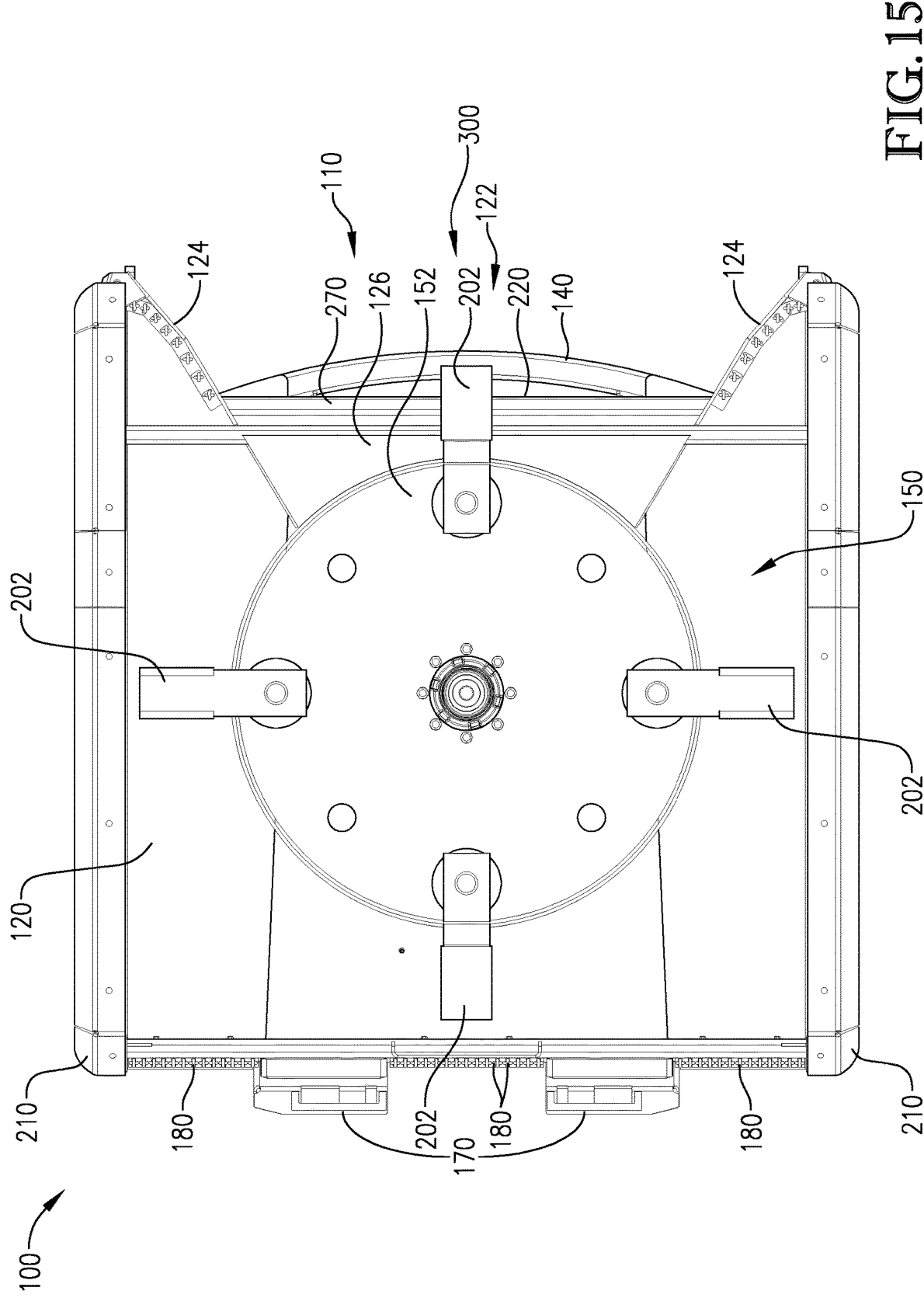
FIG. 15 is a bottom view of the cutter assembly shown in FIG. 9.

The deck 120 is generally rectangular in a plan view, except for an open front portion 122 of the deck 120 (FIG. 14). The open front portion 122 of the deck 120 generally defines an open cutting area 300 (FIG. 9) that exposes a portion of the blade path, which will be discussed in more detail below. The open front portion 122 has a generally trapezoidal perimeter, as best seen in FIG. 15. More particularly, the open front portion 122 is widest at the front end of the deck 120, with its two opposing sides 124 tapering and thus approaching one another, towards a rear edge 126 of the open front portion 122. Although not shown, in other embodiments the open front portion 122 of the deck 120 may take any other suitable shape. For example, in some embodiments the open front portion 122 may have a generally rectangular perimeter without departing from the scope of this invention.

The cutter assembly 100 also includes an attachment plate 170 on a rear of the cutter assembly 100 (i.e., an end of the deck 120 opposite of the open front portion 122), which is used to attach the cutter assembly 100 to a tractor, skidsteer, or other machinery. In some embodiments, the attachment plate 170 is a quick attachment configured to quickly couple to and disengage from a skidsteer in a conventional manner. The cutter assembly 100 also includes two skid shoes 210, each extending from the rear of the deck 120 towards the front of the deck 120. The skid shoes 210 generally define the outermost margins of the deck 120 in the width direction (i.e., a direction perpendicular to the forward movement of the cutter assembly 100 during normal operation), as best seen in FIG. 15. The skid shoes 210 form the lowermost portion of the cutter assembly 100, such that when the cutter assembly 100 is resting on the ground, the skid shoes 210 are the portion of the cutter assembly 100 in contact with the ground. The skid shoes 210 are configured to skid across the ground such that, if the cutter assembly 100 is lowered to a position where the cutter assembly 100 comes into contact with the ground, the cutter assembly 100 will be supported by the skid shoes 210 and slide across the ground via the skid shoes 210.

Figure 3:
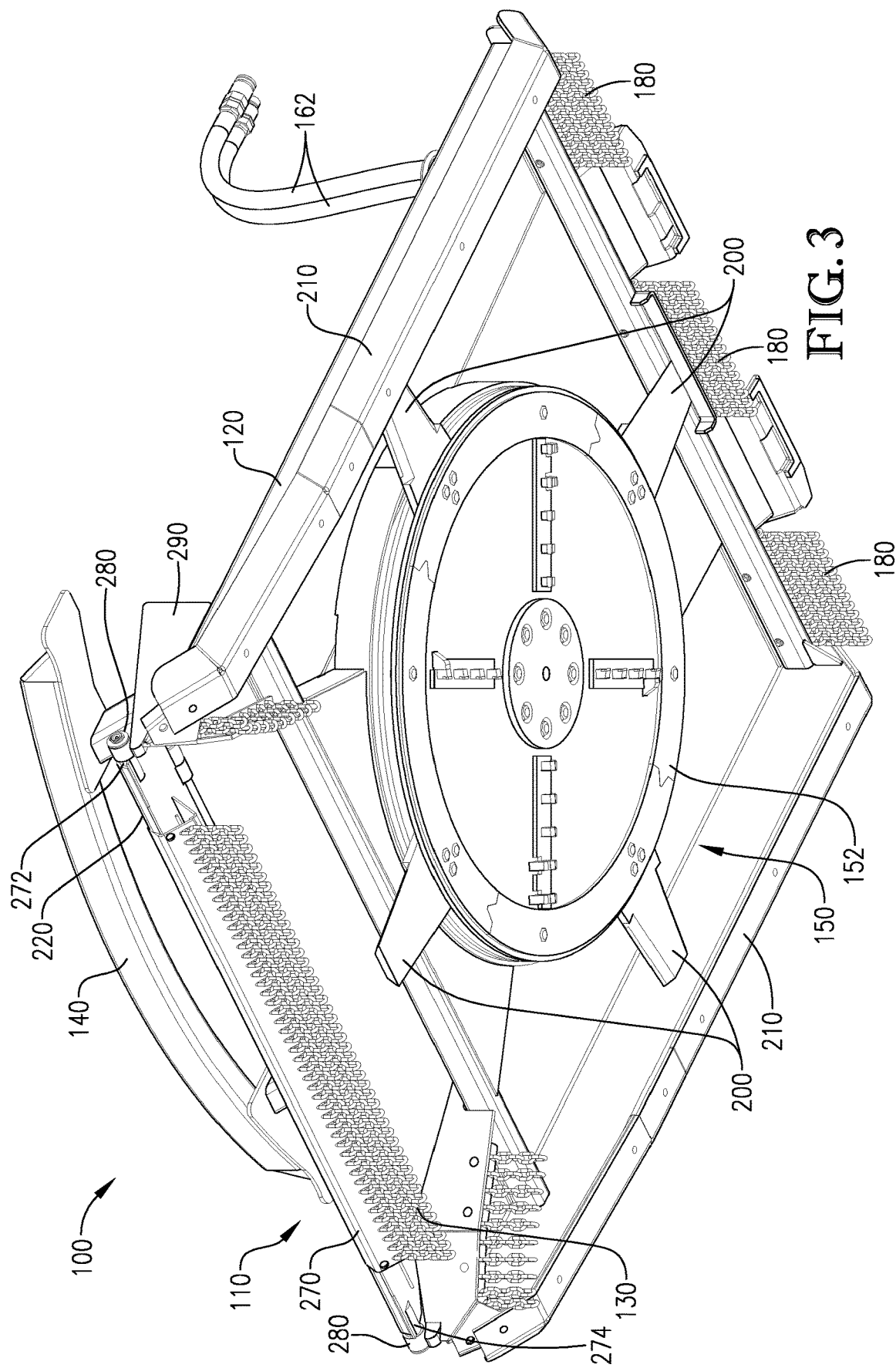
FIG. 3 is a left-front perspective view of the cutter assembly shown in FIG. 1, shown from below the cutter assembly.
Figure 4:
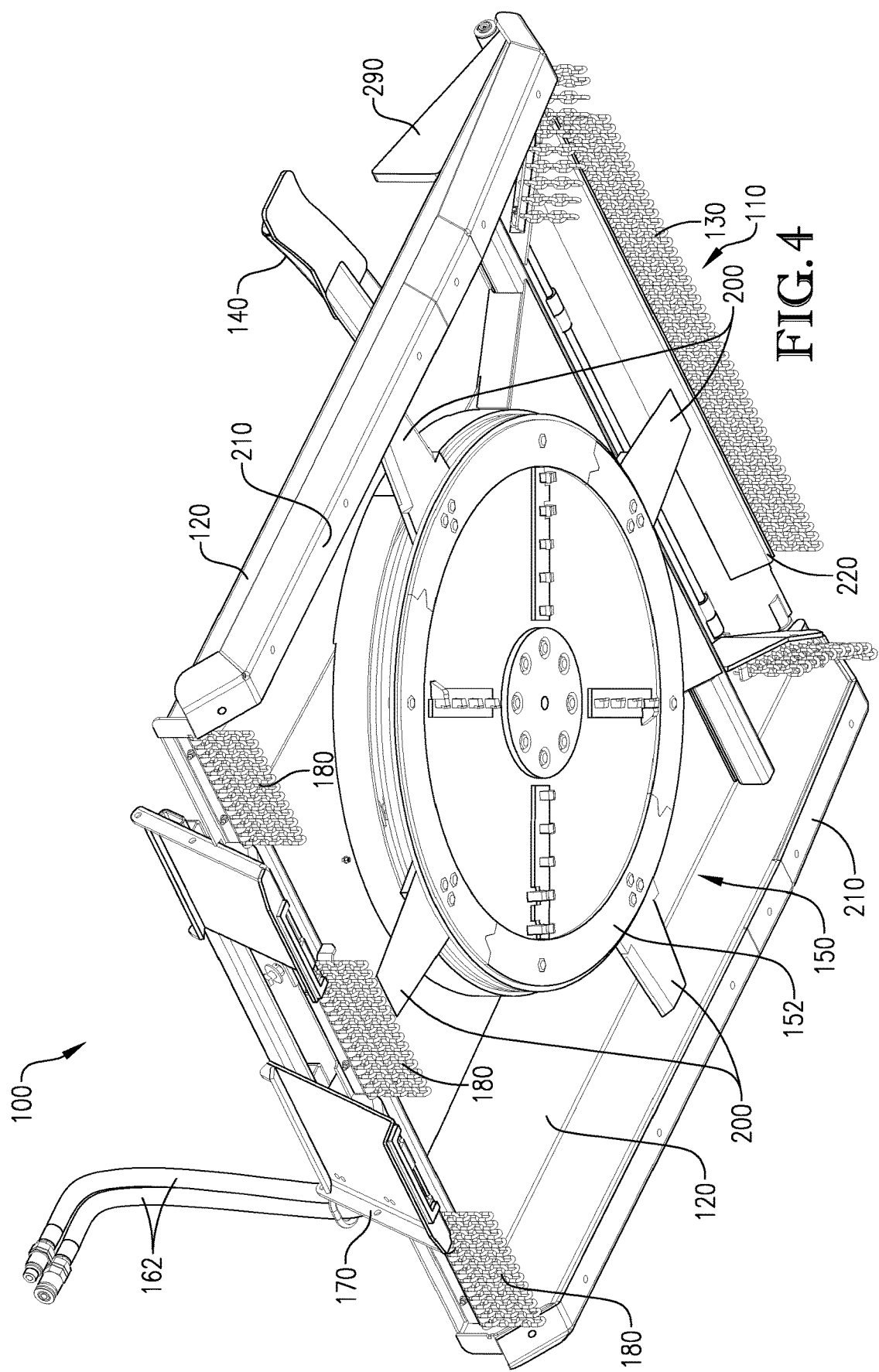
FIG. 4 is a right-rear perspective view of the cutter assembly shown in FIG. 1, shown from below the cutter assembly.
Figure 11:
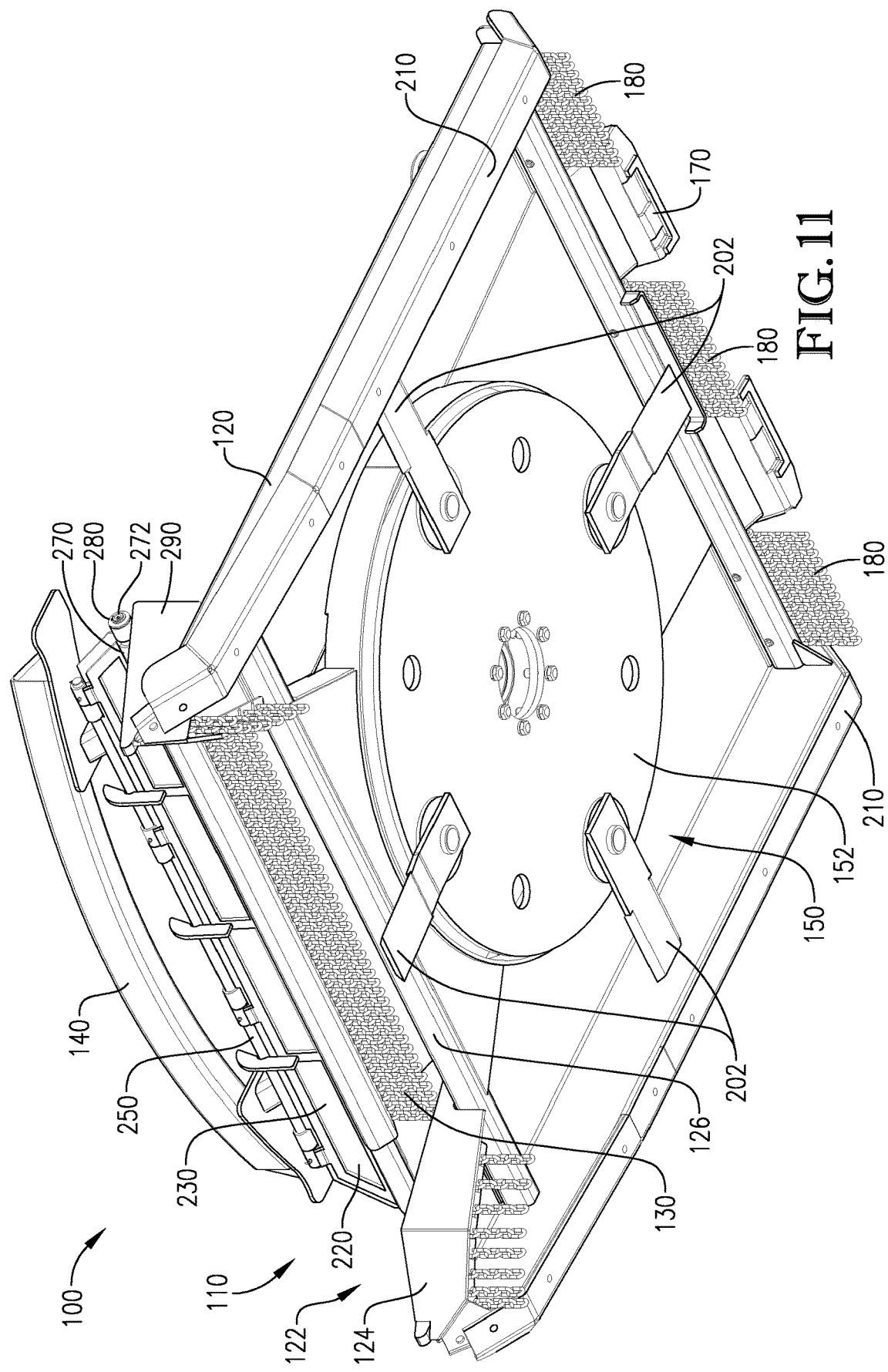
FIG. 11 is a left-front perspective view of the cutter assembly shown in FIG. 9, shown from below the cutter assembly.

At substantially the center of a top surface of the deck 120 is a motor cover 160. The motor cover 160 surrounds a hydraulic motor, gearbox, drivetrain, or the like (not shown) used to spin a blade assembly 150 (FIGS. 3 and 11). In the embodiment depicted in FIGS. 1-8, the cutter assembly 100 includes a hydraulic motor used to spin the blade assembly 150, with hydraulic hoses 162 extending therefrom and configured to connect to a hydraulic pump of, e.g., a skidsteer. In other embodiments, the cutter assembly 100 may instead include a gearbox or other coupling mechanism configured to couple to a PTO of a tractor.

Figure 10:
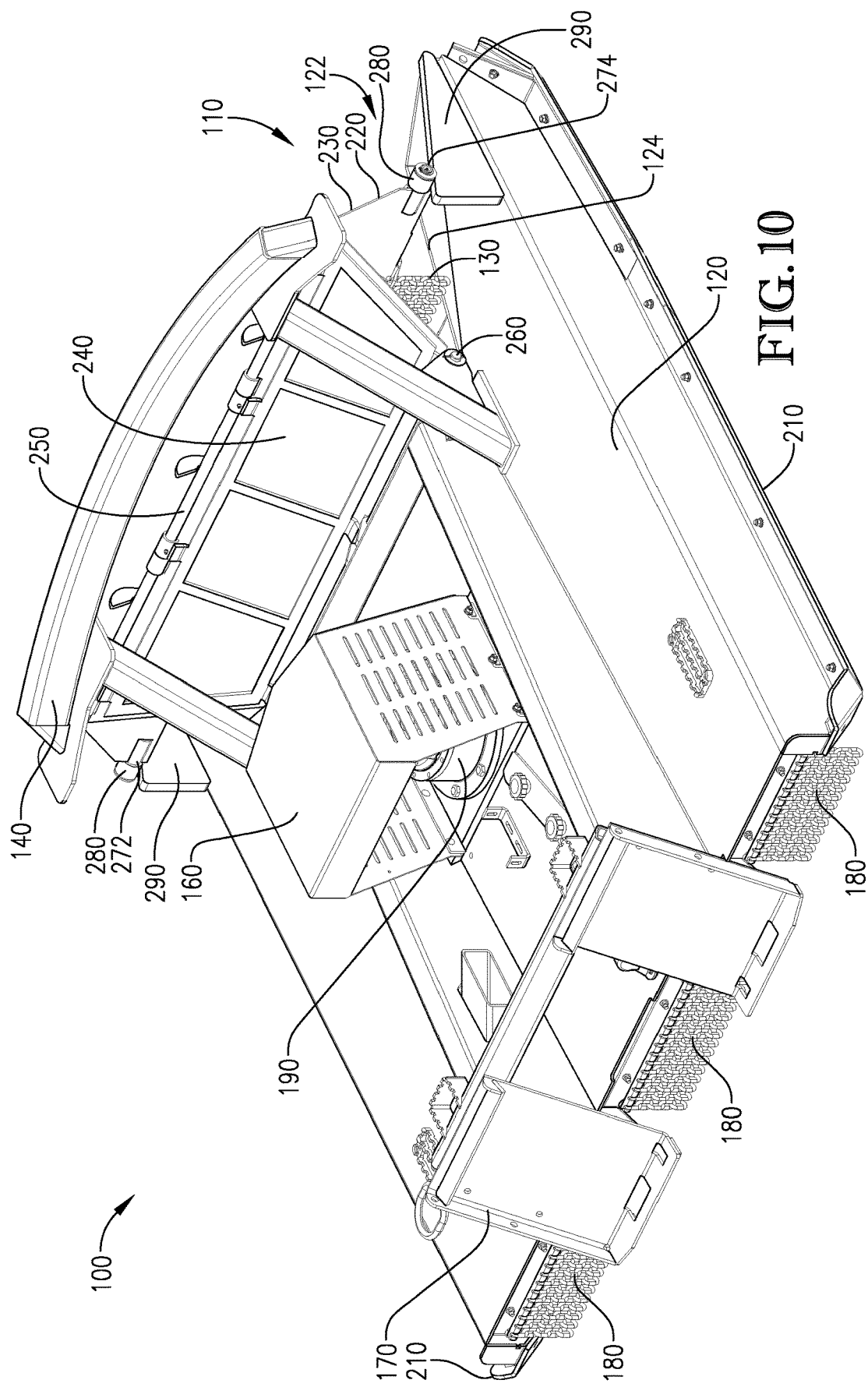
FIG. 10 is a right-rear perspective view of the cutter assembly shown in FIG. 9, shown from above the cutter assembly.
Figure 12:
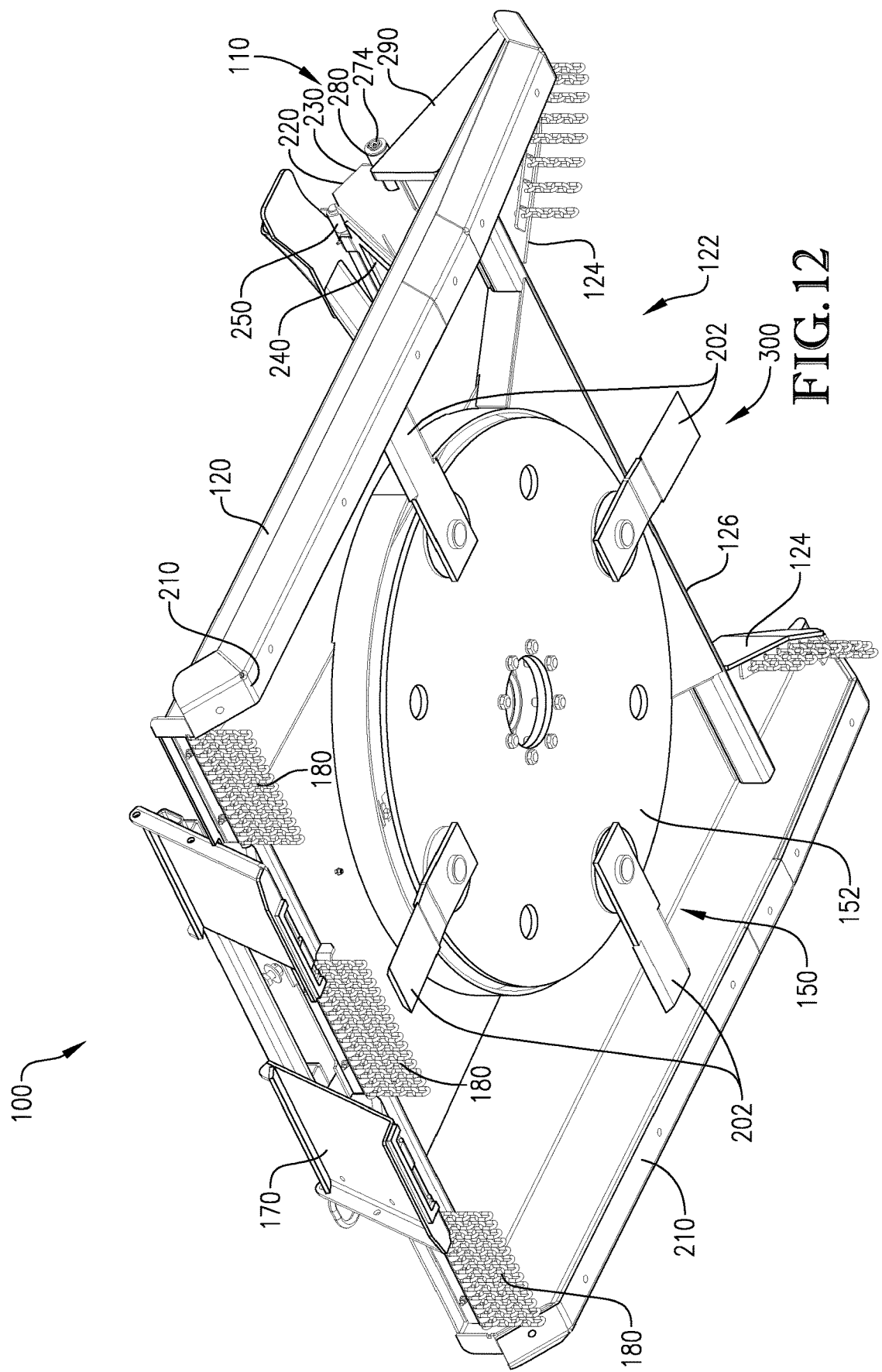
FIG. 12 is a right-rear perspective view of the cutter assembly shown in FIG. 9, shown from below the cutter assembly.

The hydraulic motor, gearbox, drivetrain, or other driving mechanism is connected to the blade assembly via a bearing housing 190. Bearing housing 190 (FIGS. 2, 10) is mounted to a through-hole in the center of the deck 120 and receives a shaft of the blade assembly 150 such that the blade assembly 150 can spin with respect to the deck 120. For example, in embodiments equipped with a hydraulic motor, hydraulic fluid is pumped to the motor via hydraulic hoses 162, causing the motor to spin and in turn spin the blade assembly 150 attached thereto. The blade assembly 150 further includes a plurality of blades 200, 202 coupled to a blade pan 152 or the like. In some embodiments, the blade assembly 150 may include four generally trapezoidal blades 200 (FIGS. 3-4, 7), and in other embodiments the blade assembly 150 may include four rectangular blades 202 (FIGS. 11-12, 15). Any other number of blades and/or suitable shape of blades may be used without departing from the scope of this disclosure. The blades 200, 202 are spun at several hundred rotations per minute, which in turn performs the cutting operation of the cutter assembly 100 when the blades 200, 202 come into contact with vegetation.

During use, the cutter assembly 100 is attached to a skidsteer or the like via attachment plate 170. As discussed, the cutter assembly 100 could alternatively be attached to a tractor or other piece of machinery, or form part of a standalone piece of machinery such as a lawnmower. For simplicity, the following discussion is made with reference solely to a skidsteer, but this should not be interpreted as limiting the instant invention to such an embodiment. The hydraulic hoses 162 are connected to a hydraulic pump of the skidsteer. Using user-operator controls inside the skidsteer, the hydraulic pump is engaged, which in turn pumps hydraulic fluid through the hydraulic motor of the cutter assembly 100 via the hydraulic hoses 162, causing the hydraulic motor to turn. The turning motor spins the blade assembly 150 and thus the flywheel 152 and the blades 200, 202 attached thereto, forming a blade path which will cut vegetation as the cutter moves across the ground.

A user moves the cutter assembly 100 along the vegetation he or she wishes to cut via the skidsteer. The user may raise or lower the cutter assembly 100 as necessary using the skidsteer's internal controls, including lowering the assembly such that the skid shoes 210 rest on the ground and the cutter assembly 100 is thus at least partly supported by the shoes 210 and slides thereon as the skidsteer moves. The cutter assembly also includes chain curtains, including a front chain curtain 130 and a rear chain curtain 180, which serve to catch any debris or clippings that may otherwise escape from under the deck 120.

Figure 16:
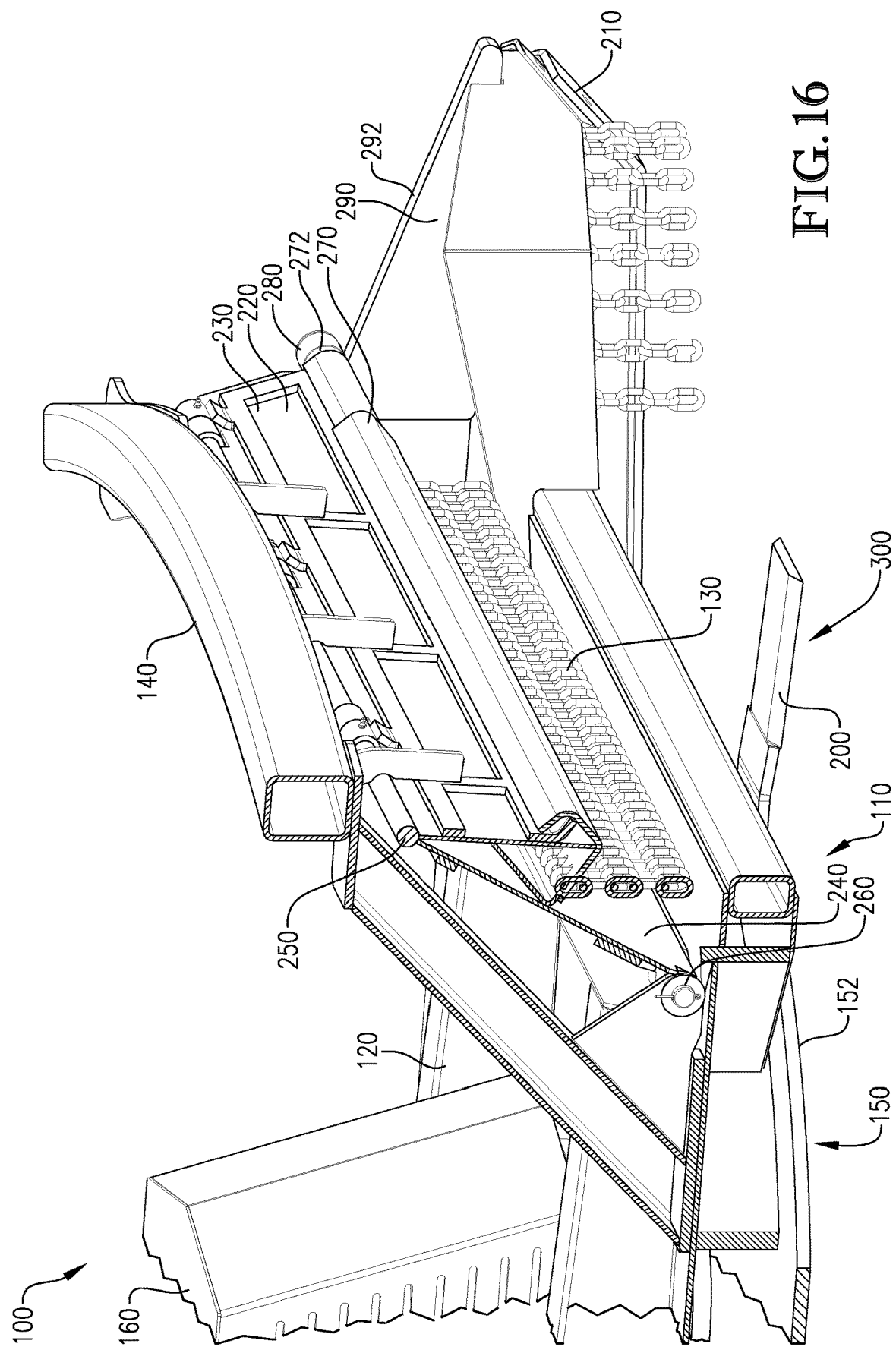
FIG. 16 is a partial right-front perspective sectional view of the cutter assembly shown in FIG. 9, shown from above the cutter assembly.

The cutter assembly 100 is also equipped with a movable blade guard 110, configured to expose the cutting area 300 when cutting large bushes, shrubs, trees, and other vegetation. More particularly, the movable blade guard 110 is configured to move from a closed position (FIGS. 1-8) to an open position (FIGS. 9-16) thereby exposing the cutting area 300 defined by the open front portion 122 of the deck 120. The cutting area 300 includes a portion of the spinning blades' 200, 202 blade path, as best seen in FIGS. 15 and 16.

The cutter assembly 100 may also include a push bar 140 used to push taller vegetation away from the cutter assembly 100. For example, in use the cutter assembly 100 may be moved in a forward direction until it encounters a large shrub or tree. Contact between the shrub or tree and the blade guard 110 causes the blade guard 110 to retract or open, as will be more fully described below. The retracted blade guard 110 in turn exposes the cutting area 300 and the portion of the blade path provided therein. That is, the ends of the spinning blades 200, 202 extend into the cutting area 300, such that the shrub or trees will contact and be cut by the spinning blades 200, 202. Moreover, due to the forward movement of the cutter assembly 100, the push bar 140 pushes the cut vegetation away from the cutter assembly 100 and thus the skidsteer and operator therein.

The blade guard 110 generally includes a bi-fold door 220 and two opposing ramps 290 flanking the open front portion 122 of the deck 120. The bi-fold door 220 includes a front cover 230 rotatably attached to a rear cover 240 via a first hinge 250, with the rear cover rotatably attached to the deck 120 via a second hinge 260. In the depicted embodiments, the front and rear covers 230, 240 have a generally trapezoidal outer perimeter, with a front edge of the rear cover 240 (i.e., an edge proximate the first hinge 250) being wider than a rear edge of the rear cover 240 (i.e., an edge proximate the second hinge 260), and with a front edge of the front cover 230 (i.e., an edge proximate the protrusions 272, 274) being wider than a rear edge of the front cover 230 (i.e., an edge proximate the first hinge 250). In other embodiments, the front and rear covers 230, 240 may be other shapes (e.g., rectangular or otherwise) without departing from the scope of this disclosure.

The bi-fold door 220 also includes two protrusions 272, 274 proximate a free/front end of the front cover 230 (i.e., the end including an impact member 270), with a respective roller 280 disposed at the protrusion 272, 274. Each roller 280 transversely slides and/or rolls along an inclined top surface 292 of a respective ramp 290 in response to the bi-fold door 220 encountering vegetation. The inclined surfaces 292 of the ramps 290 are inclined such that the rear ends thereof are at a higher elevation when the cutter assembly 100 is on level ground than the front end of the inclined surfaces 292. Put another way, the inclined surfaces 292 of the ramps 290 form an oblique angle with the substantially planar portions of the deck 120 to which the ramps 290 are attached, such that a front end of the inclined surfaces 292 of the ramps 290 (i.e., an end nearest open front end of the deck 120) is disposed at an elevation nearer to an elevation of a top surface of the deck 120 than a rear end of the inclined surfaces 292 of the ramps 290 (i.e., an end nearest to the rear of the deck 120 where the attachment plate 170 is disposed). In some embodiments, the inclined surfaces 292 of the ramps 290 form an angle between 5 degrees and 60 degrees with the substantially planar portions of the deck 120 to which the ramps 290 are attached, and in other embodiments form an angle of 10 degrees to 45 degrees, or an angle of 15 degrees to 35 degrees. In this regard, the bi-fold door 220 is normally biased to the closed position, because the rollers 280 are urged down the ramps by gravity. Although in the depicted embodiments two ramps 290 are shown, in other embodiments any suitable number of ramps 290 may be used without departing from the scope of this disclosure. For example, in some embodiments only one ramp 290 may be used.

Figure 18:
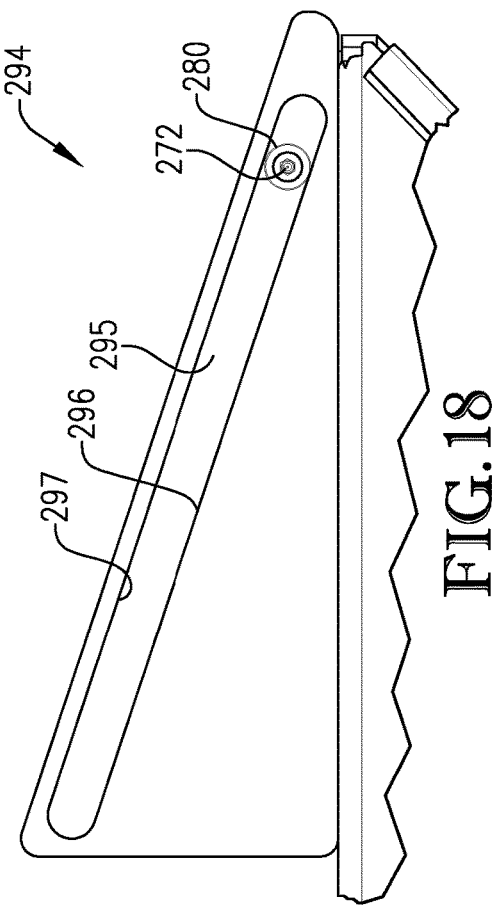
FIG. 18 is a side elevation view of an alternative ramp that can be used with the cutter assembly shown in FIGS. 1-17.

For the embodiment shown in FIGS. 1-16, the inclined surfaces 292 constitute an open, top surface of the ramps 290. However, the present invention is not so limited. For example, FIG. 18 shows an alternative ramp 294 that may be employed in embodiments of the invention. The ramp 294 includes an open slot 295 formed therein. The open slot 295 receives the protrusions 272, 274 (and the roller 280 provided thereon, if equipped), such that the protrusions 272, 274 or rollers 280 rest and thus slide upon an upward-facing, inclined surface 296 of the ramp 294. In this embodiment, a downward-facing, inclined surface 297 prevents vertical movement of the protrusions 272, 274 and/or rollers 280 off of the upward-facing, inclined surface 296. Therefore, unlike in embodiments utilizing ramp 290, in these embodiments the bi-fold door 220 is prevented from raising substantially in the vertical direction when the door 220 (and more particularly, a reinforced impact member 270 of the door 220) encounters tall vegetation or other objects, as will be more fully discussed below.

In use, an operator moves a skidsteer or other machinery with the cutter assembly 100 coupled thereto towards a shrub, bush, tree, or other vegetation to be cut. When the front end of the cutter assembly 100 reaches tall, solid vegetation (e.g., a tree), the front end of the bi-fold door 220, and more particularly the reinforced impact member 270, contacts the vegetation, which imparts a force on the bi-fold door 220. The reinforced impact member 270 faces away from the vehicle (i.e., the skidsteer, tractor, or other machinery) and is open for engagement with brush, bushes, shrubs, trees, and other tall vegetation. That force imparted on the impact member 270, in turn, overcomes the gravity force holding the bi-fold door 220 in the closed, substantially flat position (FIGS. 1-8), pushing the protrusions 272, 274 up the two ramps 290. The magnitude of the impact force required to retract the door 220 can be 5 to 100 lbs., 10 to 80 lbs., or 20 to 60 lbs. As the protrusions 272, 274 traverse the inclined surfaces 292 of the two ramps 290, the rear cover 240 rotates above the second hinge 260 in a first direction, and the front cover 230 rotates about the first hinge 250 in a second direction, opposite the first direction.

Figure 5:
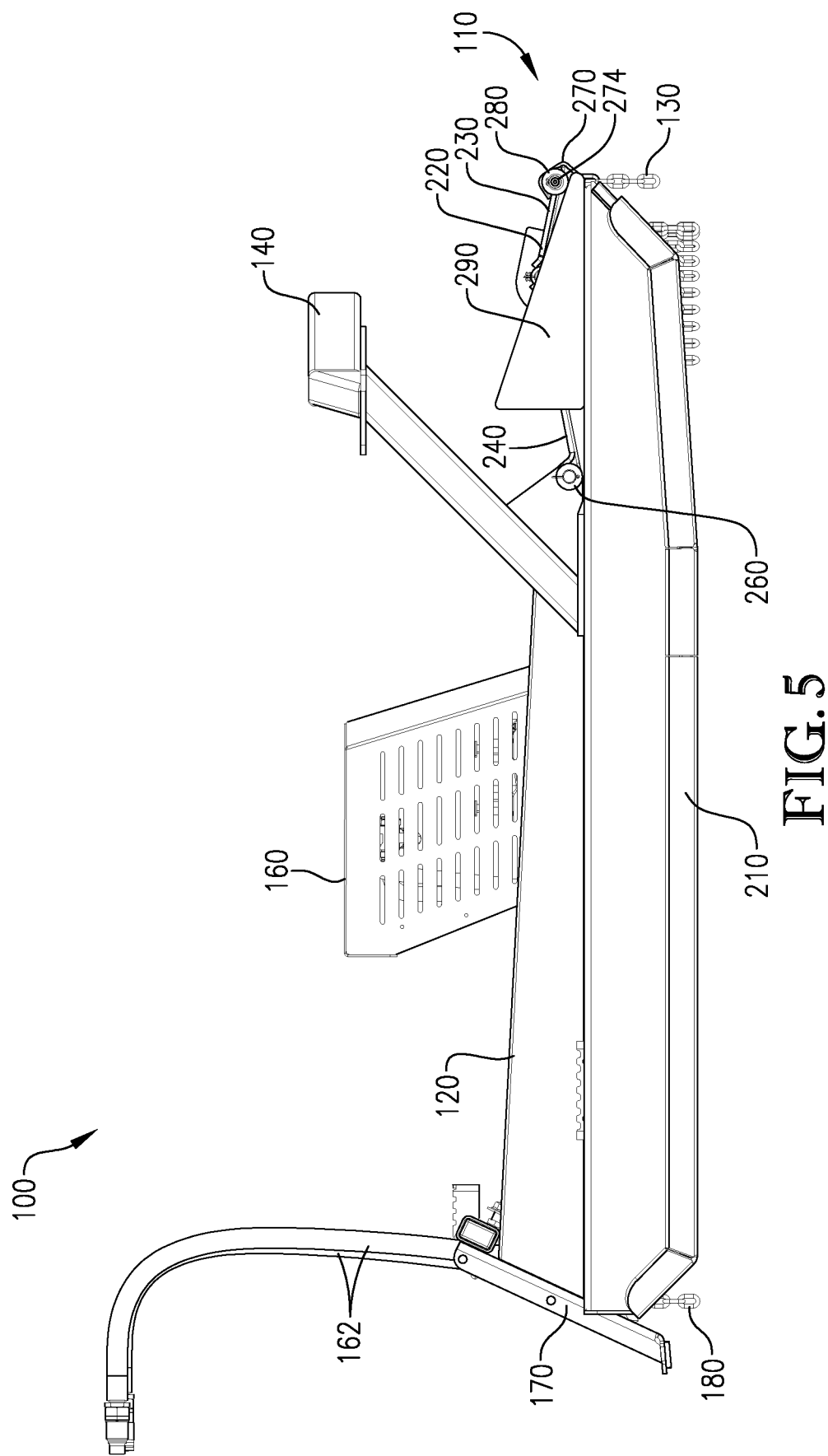
FIG. 5 is a right side view of the cutter assembly shown in FIG. 1.
Figure 6:
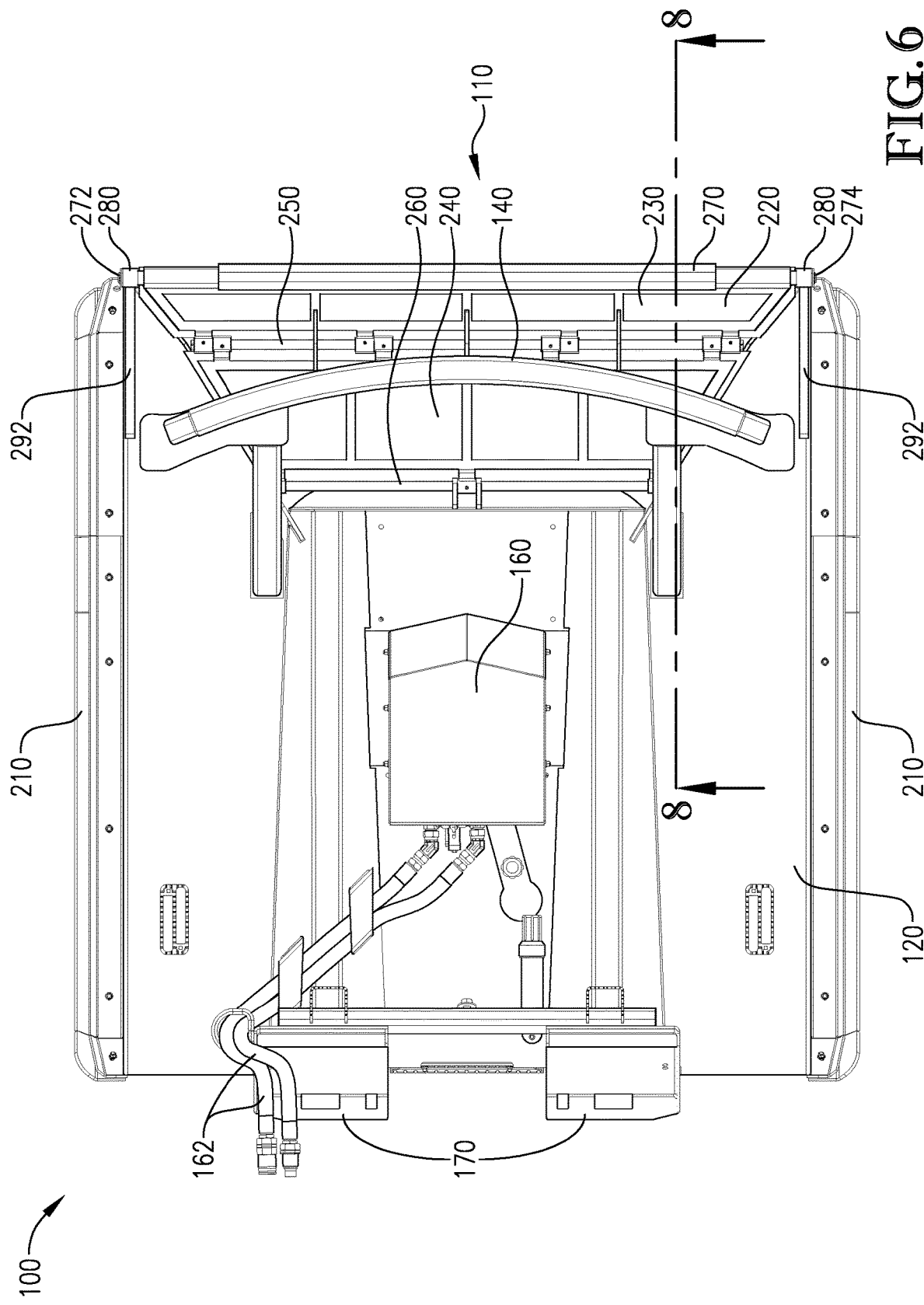
FIG. 6 is a top view of the cutter assembly shown in FIG. 1.
Figure 13:
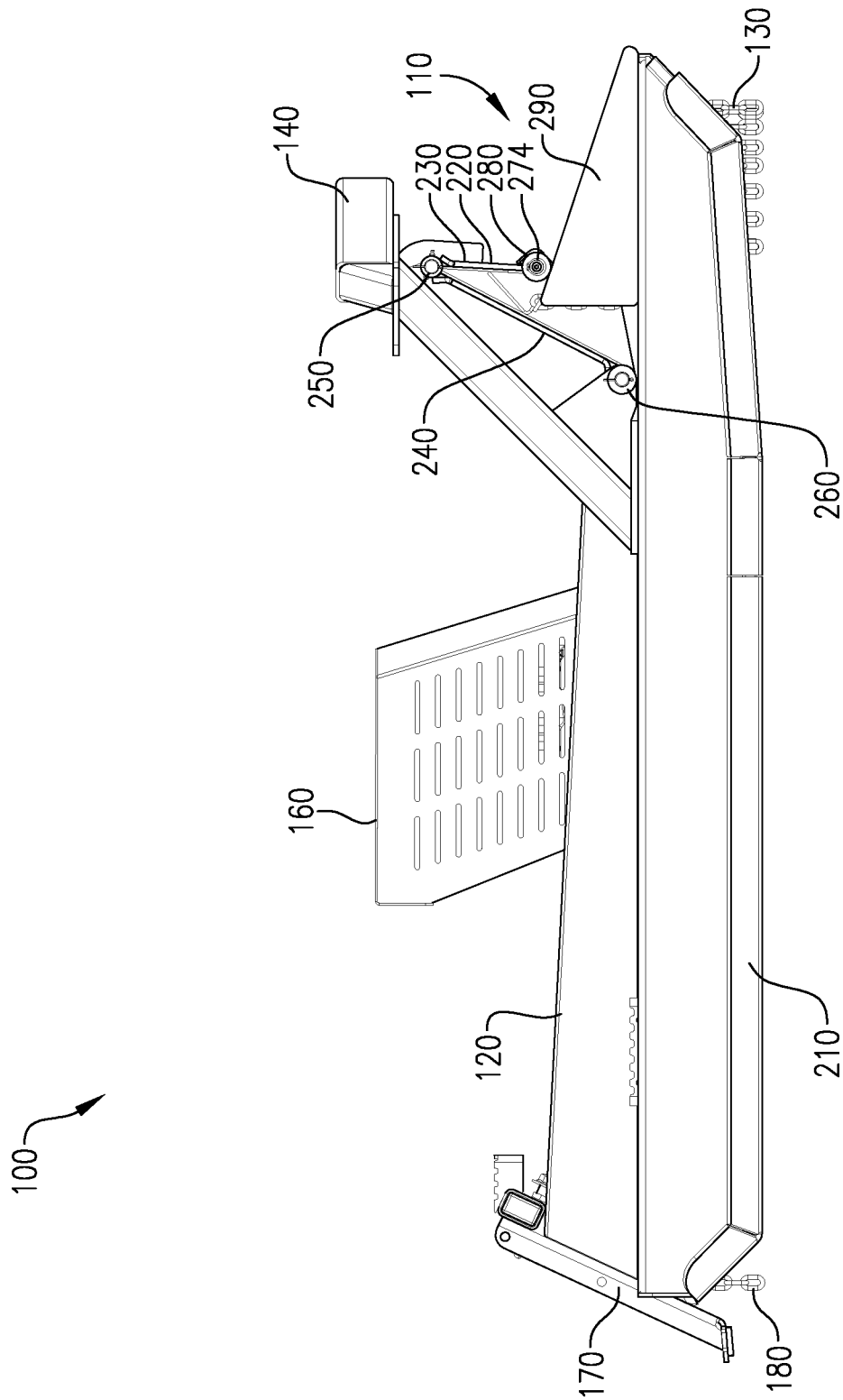
FIG. 13 is a right side view of the cutter assembly shown in FIG. 9.

More particularly, with reference to the right-side view seen in FIGS. 5 and 13, the rear cover 240 rotates above the second hinge 260 in a counterclockwise direction, while the front cover 230 rotates about the first hinge 250 in a clockwise direction. In response, the bi-fold door 220 folds along the first hinge 250 such that the first cover 230 and rear cover 240 approach one another. In this regard, the second hinge 260 is fixed relative to the deck 120, but the first hinge 250 moves relative to the deck 120. Although in some embodiments (not shown) the bi-fold door 220 may include more than two hinges 250, 260, in the embodiments shown FIGS. 1-16 the bi-fold door 220 includes only two pivot axes (i.e., hinges 250, 260), thus advantageously reducing the complexity and moving parts of the bi-fold door 220.

Figure 7:
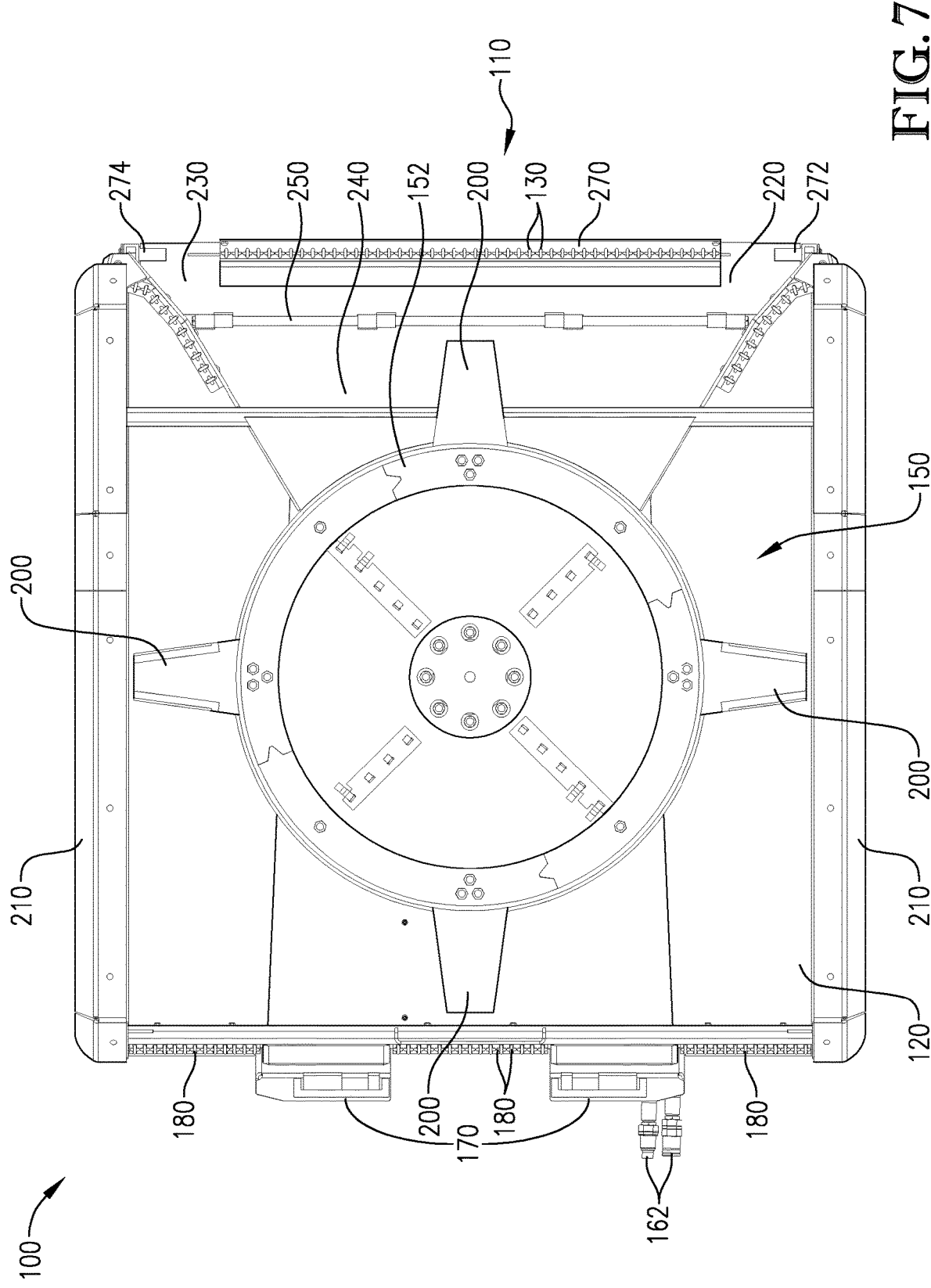
FIG. 7 is a bottom view of the cutter assembly shown in FIG. 1.
Figure 8:
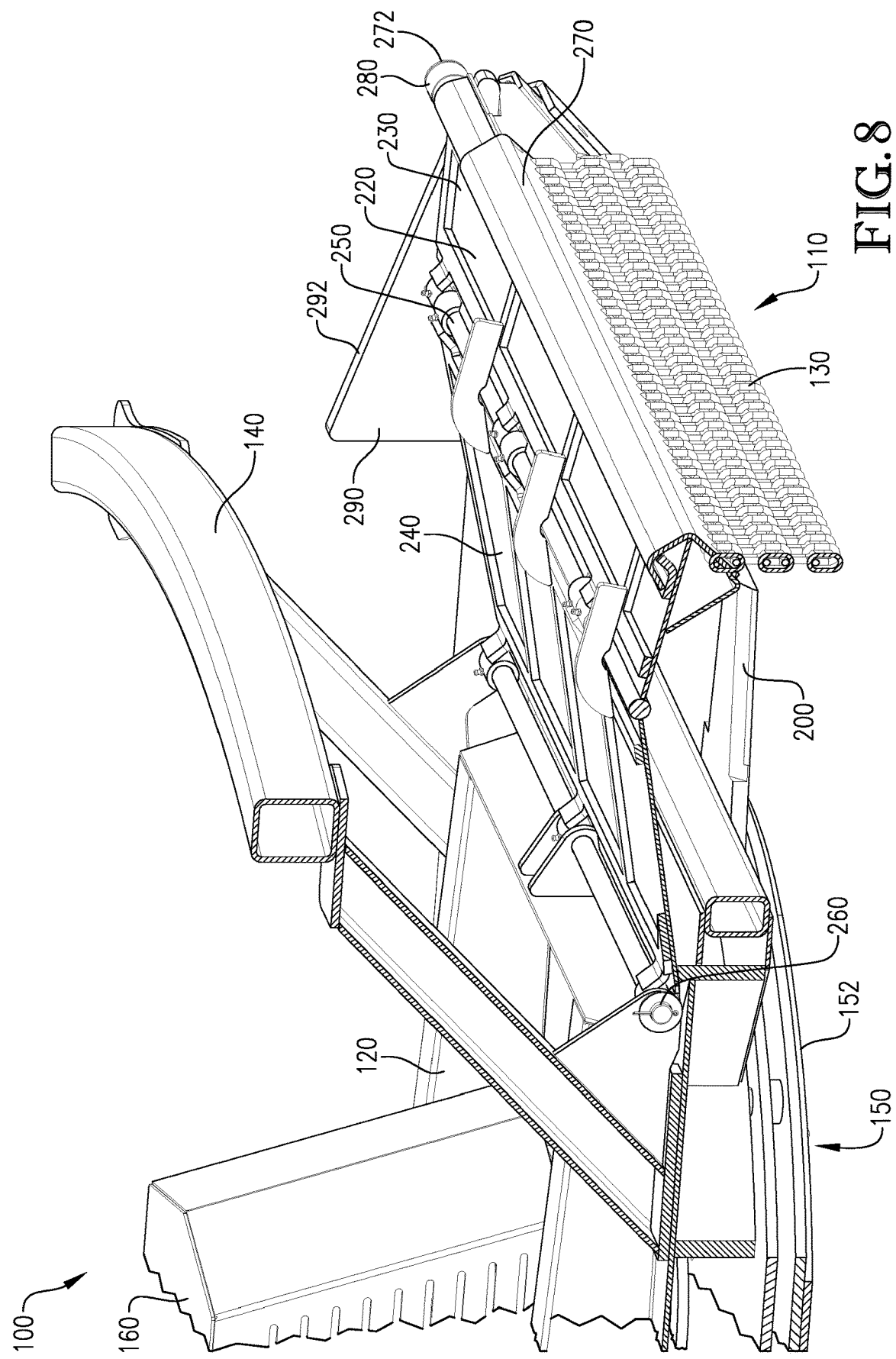
FIG. 8 is a partial right-front perspective sectional view of the cutter assembly shown in FIG. 1, shown from above the cutter assembly.

The folded or retracted bi-fold door 220 (FIGS. 9-16) exposes the cutting area 300 to bushes, shrubs, trees, and other tall brush. As best seen in FIG. 15, when the cutting area 300 is exposed, the push bar 140 of the cutter assembly 100—which extends out into the cutting area 300 farther than the blade path (FIGS. 14-15)—will encounter tall brush. The bar 140 will thus push the brush as the cutter assembly 100 moves forward. Then, the spinning blades 200, 202 will encounter and cut the brush as the cutter assembly 100 continues to move forward. Once the brush is cut and clear of the cutting area 300, gravity will move the bi-fold door 220 back into the closed position (FIGS. 1-8). More particularly, the bi-fold door 220 returns to the closed position via rollers 280 and/or protrusions 272, 274 retreating down the inclined surfaces 292 of the ramps 290 via gravity, until the cutting area 300 is no longer exposed (FIG. 7). In this regard, the bi-fold door 220 acts to close the open front portion 122 of the deck 120, guarding from debris and other clippings escaping from underneath the deck 120 during cutting grass and other short vegetation.

Figure 17:
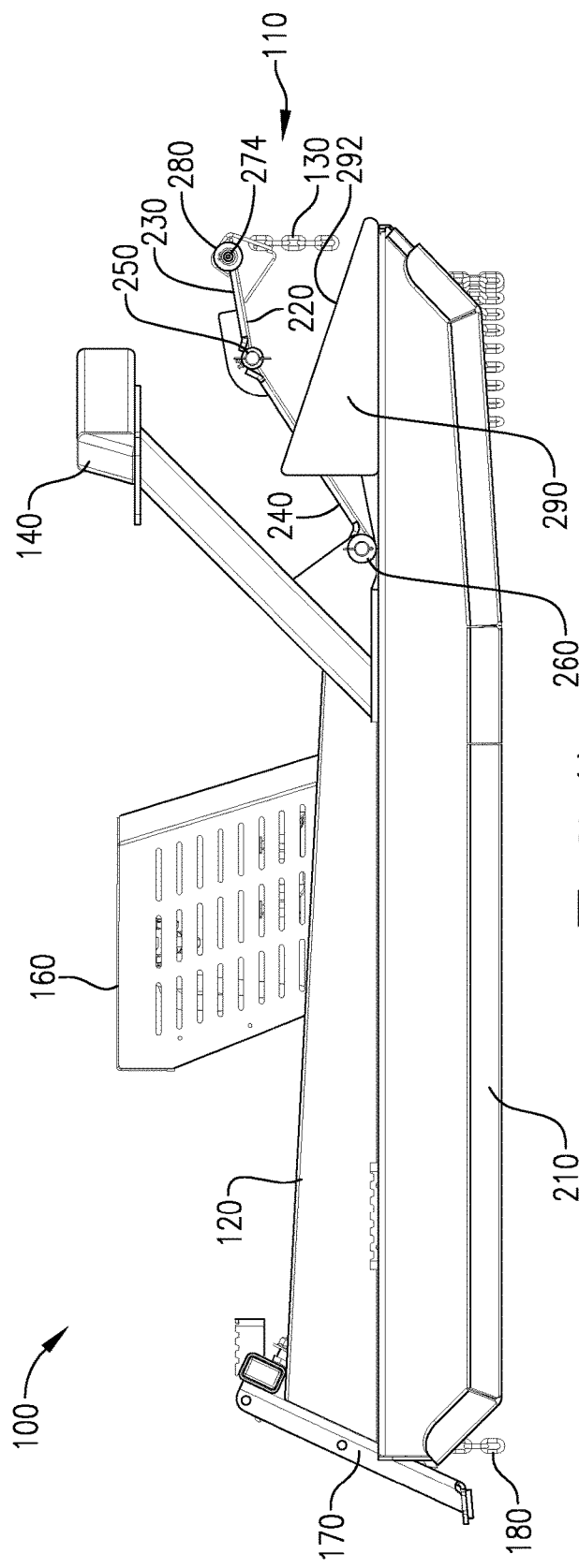
FIG. 17 is a right side view of the cutter assembly shown in FIG. 1, shown with the bi-fold door in a flat position but with the front of the door being raised out of engagement with the ramps.

In embodiments employing ramps 290, the bi-fold door 220 is capable of raising without rotation of the front cover 230 and rear cover 240 relative to one another, as shown in FIG. 17. More particularly, because the inclined surface 292 of the ramp 290 is an open, top surface of the ramp 290, the entire cover may lift and rotate about the second hinge 260, with little or no rotation of any portions of the bi-fold door 220 about the first hinge 250. In such embodiments, in response to vegetation (e.g., a tree or the like) imparting an upward force on the impact member 270 and/or bi-fold door 220, the protrusions 272, 274 will separate from the respective ramp 290, and the entire door 220 will pivot about the second hinge 260 and thus lift upwards with respect to the deck 120 with little (or even no) relative movement between the front cover 230 and rear cover 240, as depicted in FIG. 17. However, in embodiments employing ramps 294 (FIG. 18), the downward-facing, inclined surface 297 restricts movement of the protrusions 272, 274 in the vertical direction, such that any movement of the protrusions 272, 274 will generally follow the inclined surface 296. Thus, in these embodiments, the bi-fold door 220 is not capable of raising without rotation of the front cover 230 and rear cover 240 relative to one another, because when vegetation imparts a vertical force on the bi-fold door 220, the protrusions 272, 274 will contact the downward-facing, inclined surface 297, thus preventing the door 220 from pivoting about the second hinge 260 without rotation of the front cover 230 relative to the rear cover 240. Thus, the bi-fold door 220 will always fold when it moves in response to the impact member 270 encountering vegetation or other objects when employing ramps 294.

In some embodiments, at least part of the front chain curtain 130 may be attached to the front end of the bi-fold door 220 (proximate the impact member 270) such that the front chain curtain 130 seals the otherwise open front end of the cutter assembly 100 when the bi-fold door 220 is in the flat or closed position, as best seen in FIG. 1. That portion of the front chain curtain 130, in turn, will move with bi-fold door 220 as it moves to the open, retracted position, such that the chain curtain 130 will hang down from the open bi-fold door 220 (FIGS. 11, 16). In this regard, the portion of the front chain curtain 130 attached to the bi-fold door 220 may serve to shield from debris and other flying vegetation when the bi-fold door 220 is in the open position. Moreover, the upward movement of the front end of the bi-fold door 220 caused by inclined surfaces 292 of the ramps 290 raises the chain curtain 130 above the blade path as the door 220 moves to the open, retracted position, preventing the chains from entering the blade path.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

We claim:

1. A cutter comprising:
   a deck including a first end and an opposing second end;
   a bearing housing coupled to the deck between the first end and the second end;
   a blade assembly rotatably coupled to the deck via the bearing housing, the blade assembly including a plurality of blades; and
   a movable blade guard disposed at the first end of the deck and configured to move between a closed position and an open position, the blade guard comprising a first cover, a second cover, a first hinge, a second hinge, one or more protrusions, and one or more ramps presenting an inclined surface, wherein the first cover is rotatably coupled to the second cover via the first hinge, wherein the second cover is rotatably coupled to the deck via the second hinge, and wherein the one or more protrusions can move along the inclined surface of the one or more ramps as the blade guard moves between the closed position and the open position.

2. The cutter according to claim 1, wherein the one or more protrusions include one or more rollers, wherein the one or more rollers contact the inclined surface of the one or more ramps.

3. The cutter according to claim 1, wherein the inclined surface of the one or more ramps is disposed at an oblique angle with respect to a substantially planar portion of a top surface of the deck to which the one or more ramps is attached.

4. The cutter according to claim 1, wherein, as the blade guard moves from the closed position to the open position, the first cover rotates in a first direction about the first hinge, and the second cover rotates in a second direction about the second hinge, wherein the second direction is opposite to the first direction.

5. The cutter according to claim 1, wherein the deck further comprises an open front portion defining an open cutting area, the open cutting area being an area in which the plurality of blades extends when blade assembly is spinning, wherein when in the closed position the blade guard covers the open cutting area, and wherein when in the open position the blade guard exposes the open cutting area.

6. The cutter according to claim 5 further comprising a push bar mounted to and extending above the deck, wherein at least part of the push bar is disposed above the open cutting area, and wherein at least a portion of the push bar extends farther in a first direction than the plurality of blades extends when the blade assembly is spinning, the first direction being a direction extending from the second end of the deck towards the first end of the deck.

7. The cutter according to claim 1, wherein the one or more protrusions includes two protrusions extending from opposite ends of a front edge of the first cover, wherein the one or more ramps includes two ramps.

8. The cutter according to claim 1 further comprising an impact member proximate to a front edge of the first cover, wherein the impact member is configured to receive an impact force sufficient to cause movement of the blade guard from the closed position toward the open position.

9. The cutter according to claim 1, wherein the second hinge is fixed relative to the deck, and wherein the first hinge is movable relative to the deck.

10. The cutter according to claim 1, wherein the movable blade guard includes only two pivot axes.

11. A rotary cutter comprising:
a deck including a first end, an opposing second end, and an open front portion proximate to the first end, the open front portion defining a cutting area;
a bearing housing coupled to the deck between the first end and the second end;
a blade assembly rotatably coupled to the deck via the bearing housing, the blade assembly including a plurality of blades; and
a bi-fold door proximate to the open front portion of the deck and configured to move between a closed position in which the bi-fold door shields the cutting area and an open position in which the bi-fold door exposes the cutting area, the bi-fold door comprising a front cover, an impact member proximate to a front edge of the front cover, a rear cover, a first hinge, a second hinge, two protrusions extending outwardly from opposite ends of the front edge of the front cover, a first ramp, and a second ramp, wherein the front cover is rotatably coupled to the rear cover via the first hinge, wherein the rear cover is rotatably coupled to the deck via the second hinge, wherein the first ramp and second ramp flank the open front portion of the deck, and wherein the two protrusions are configured to slide along inclined surfaces of the first ramp and the second ramp as the bi-fold door moves between the closed position and the open position.

12. The rotary cutter according to claim 11, wherein the two protrusions include a first roller and a second roller, the first roller disposed at a first one of the two protrusions and the second roller disposed at a second one of the two protrusions, wherein the first roller contacts the inclined surface of the first ramp, and the second roller contacts the inclined surface of the second ramp.

13. The rotary cutter according to claim 11, wherein the inclined surfaces of the first and second ramps are disposed at an oblique angle with respect to a substantially planar portion of a top surface of the deck to which the first ramp and the second ramp are attached.

14. The rotary cutter according to claim 11, wherein, as the bi-fold door moves from the closed position to the open position, the front cover rotates in a first direction about the first hinge, and the rear cover rotates in a second direction about the second hinge, wherein the second direction is opposite to the first direction.

15. The rotary cutter according to claim 11, wherein the cutting area is an area in which the plurality of blades extends when the blade assembly is spinning.

16. The rotary cutter according to claim 15 further comprising a push bar mounted to and extending above the deck, wherein at least part of the push bar is disposed above the cutting area, and wherein at least a portion of the push bar extends farther in a first direction than the plurality of blades extends when the blade assembly is spinning, the first direction being a direction extending from the second end of the deck towards the open first end of the deck.

17. The rotary cutter according to claim 11, wherein the second hinge is fixed relative to the deck, and wherein the first hinge is movable relative to the deck.

18. The rotary cutter according to claim 11, wherein the bi-fold door includes only two pivot axes.

19. A method of cutting vegetation comprising:
(a) cutting vegetation with a rotary cutter having a deck and a bi-fold door covering an open front portion the deck, the bi-fold door including a front impact member along a front edge of the bi-fold door, one or more protrusions, and one or more ramps presenting an inclined surface;
(b) contacting the front impact member with a tree; and
(c) simultaneously with step (b), continuing to move the rotary cutter toward the tree, thereby causing the bi-fold door to retract by pivoting on two or less axes so that the tree is received in the open front portion of the deck and cut by one or more blades of the rotary cutter, wherein, as the bi-fold door retracts, the one or more protrusions move along the inclined surface of the one or more ramps.

20. The method of claim 19, further comprising, after step (c), repositioning the bi-fold door to a closed position via gravity.

21. The method of claim 19, wherein the pivoting of step (c) comprises pivoting the bi-fold door about two axes such that a first cover of the bi-fold door pivots about a first hinge in a first direction, and a second cover of the bi-fold door pivots about a second hinge in a second direction opposite to the first direction.

* * * * *